Jan. 6, 1925.
W. FREEGARD ET AL
1,522,234
SHINGLE STAPLING AND FOLDING MACHINE
Filed June 21, 1923 6 Sheets-Sheet 5
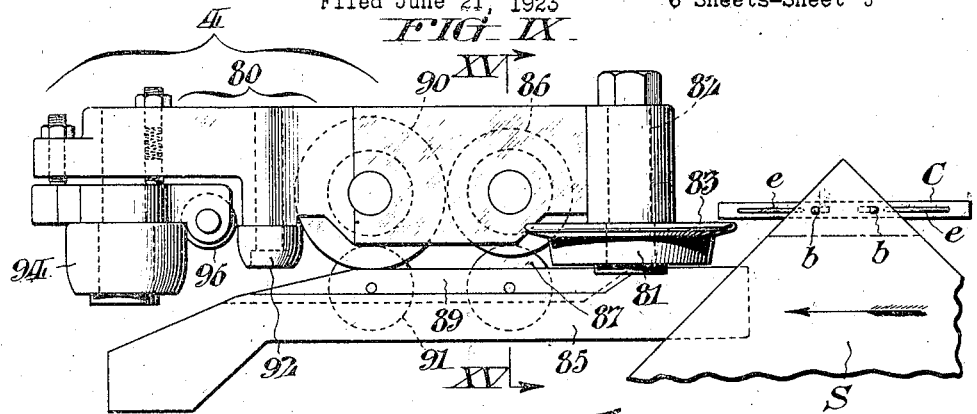
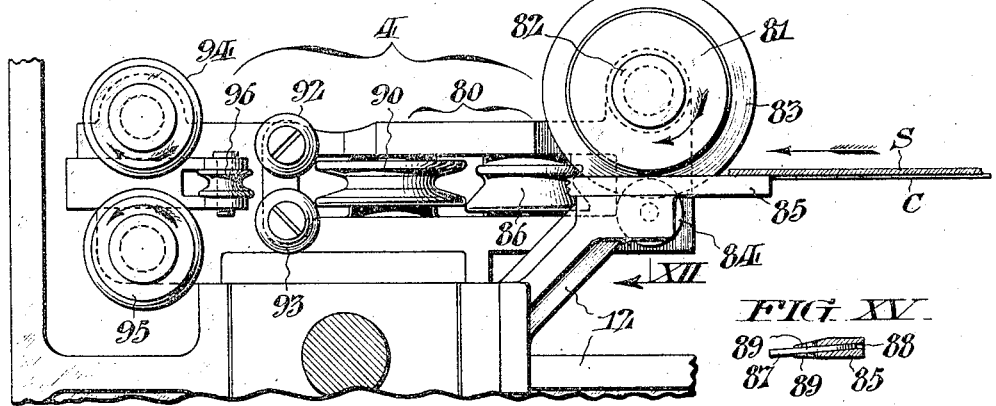
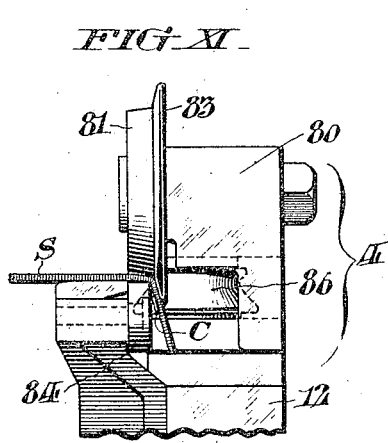
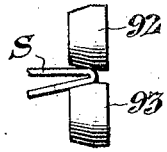
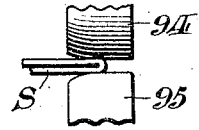
WITNESSES:
Alfred E. Ischinger.
Thomas W. Kerr, Jr.
INVENTORS:
William Freegard &
Marius S. Barrow,
BY Fraley & Paul
ATTORNEYS.

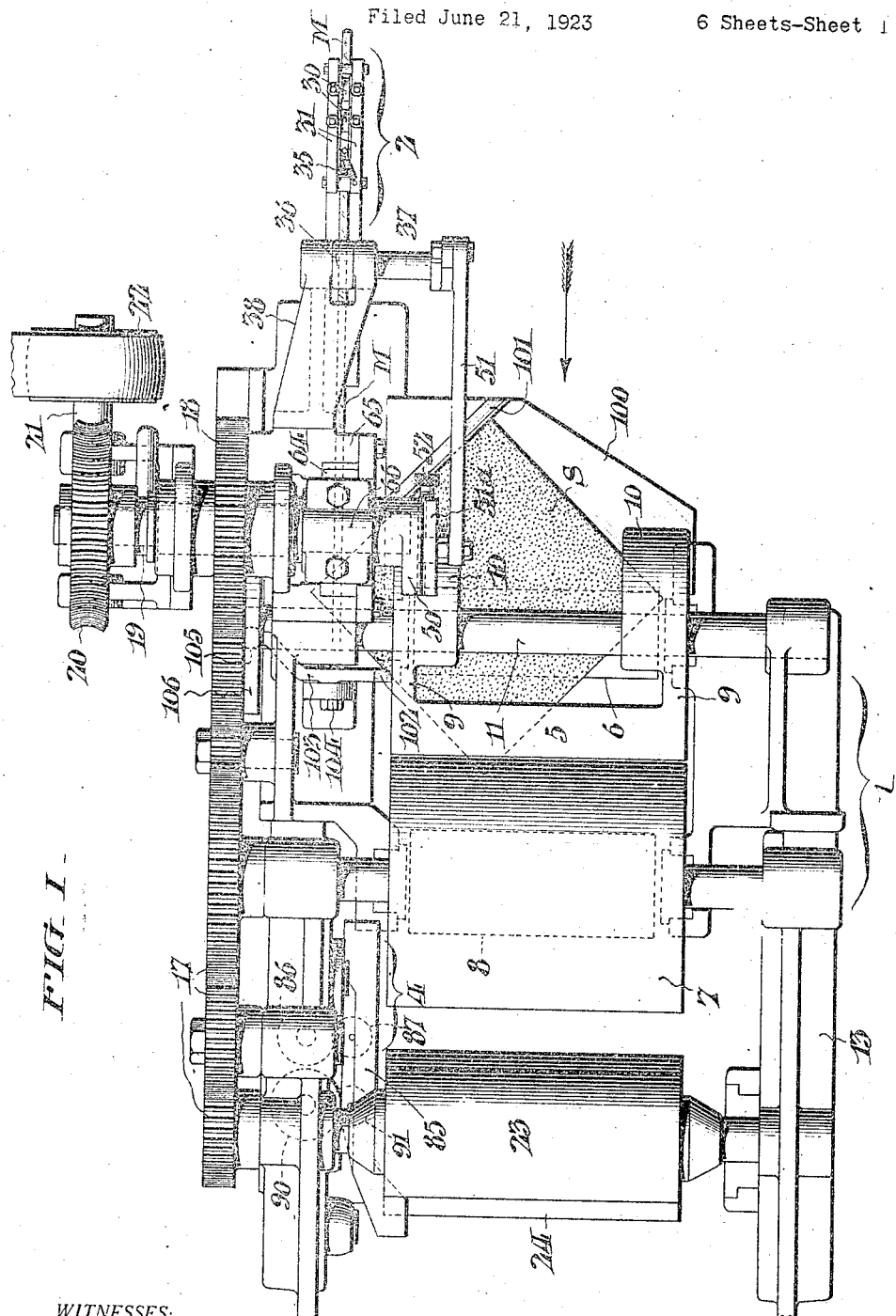

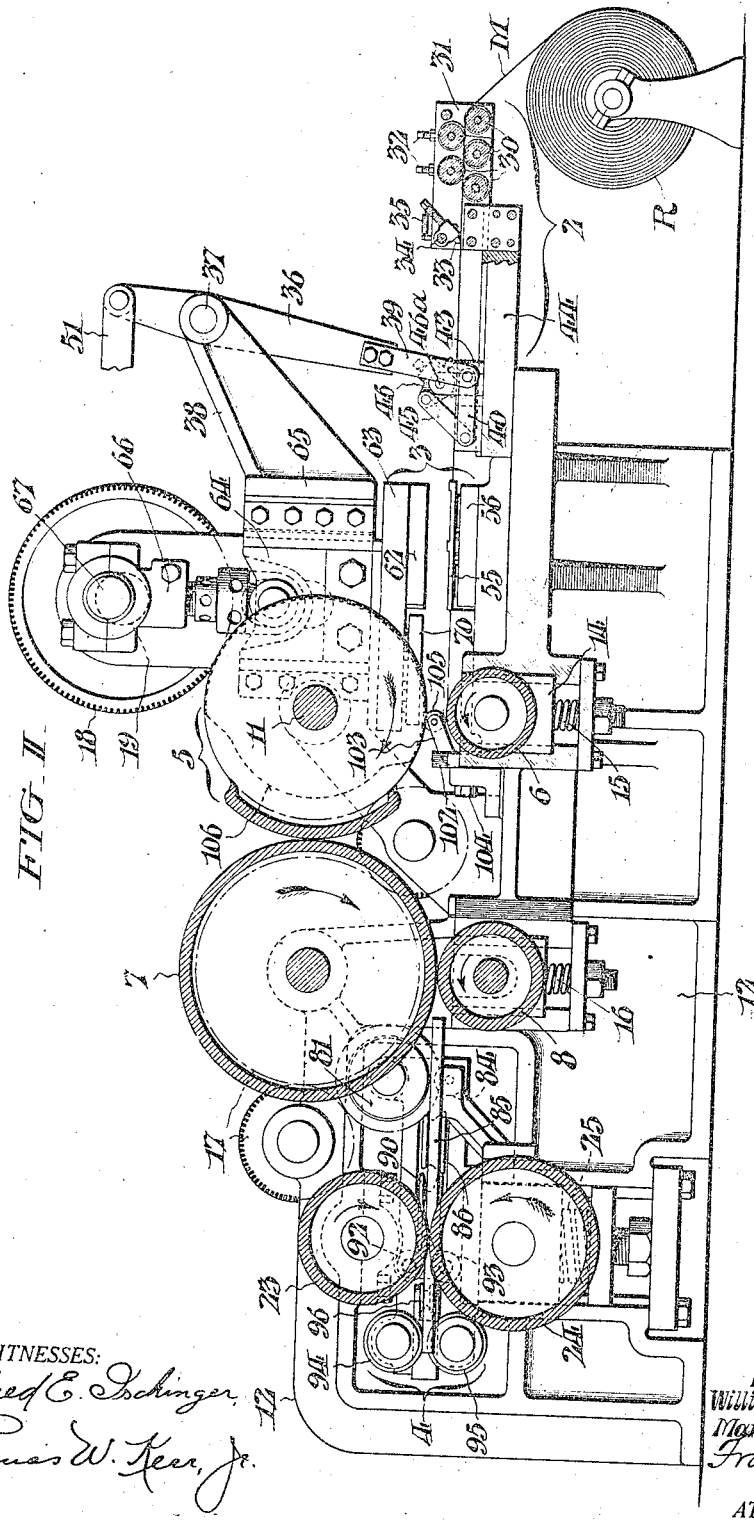

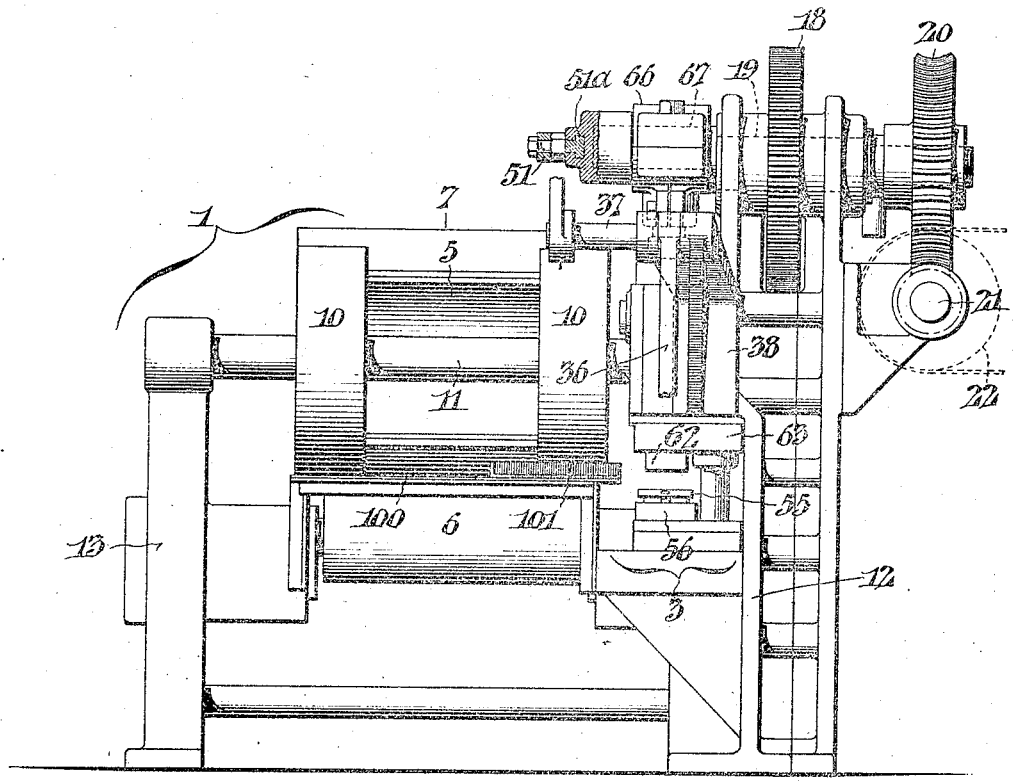

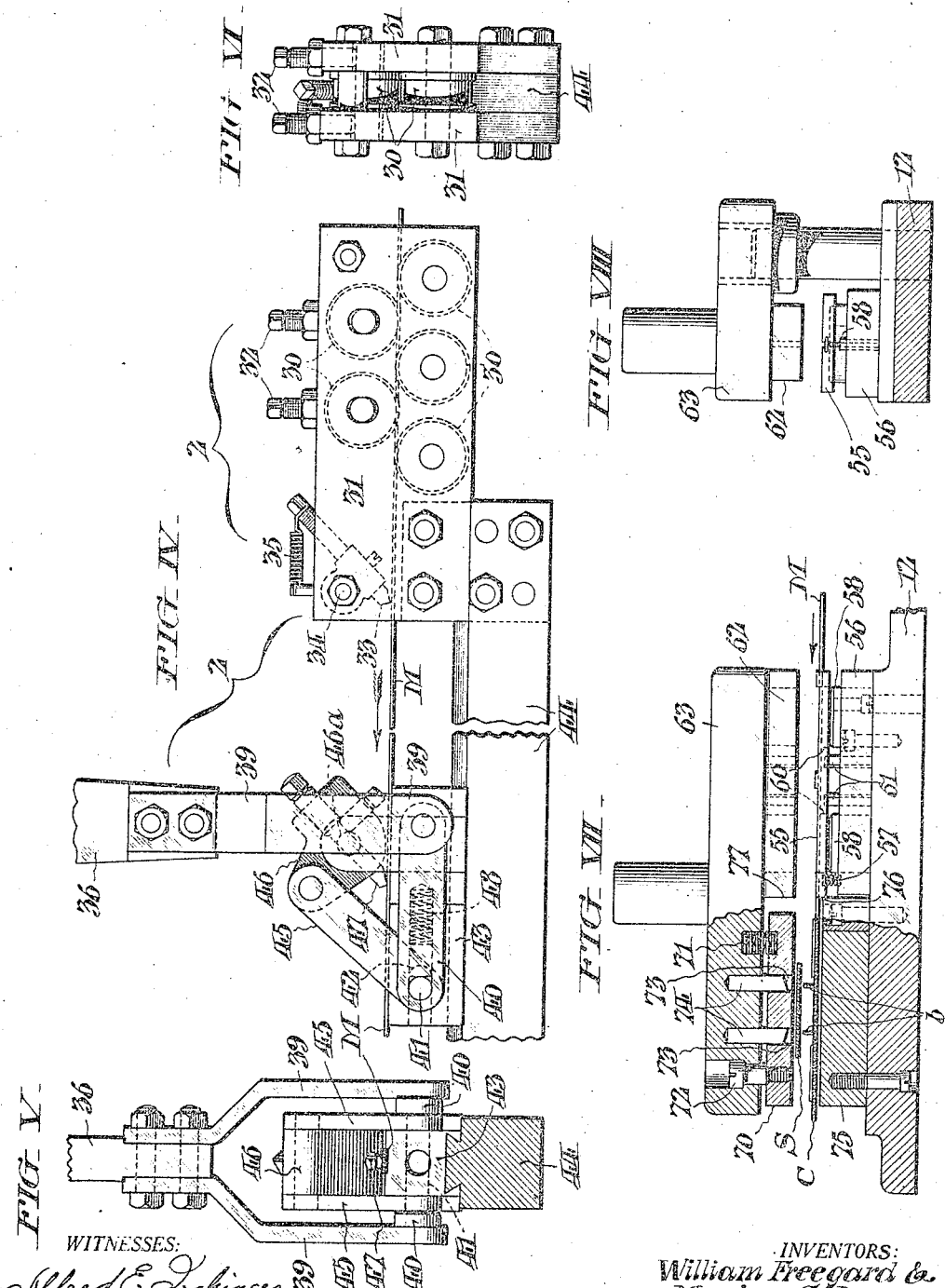

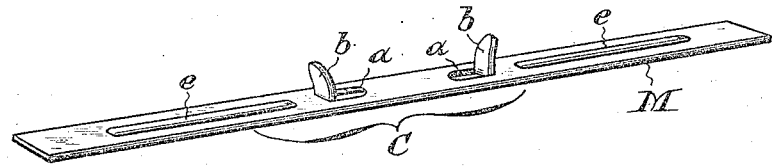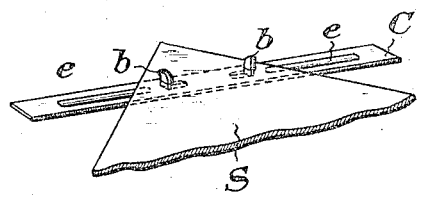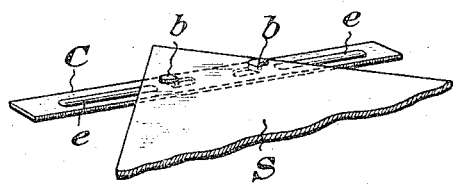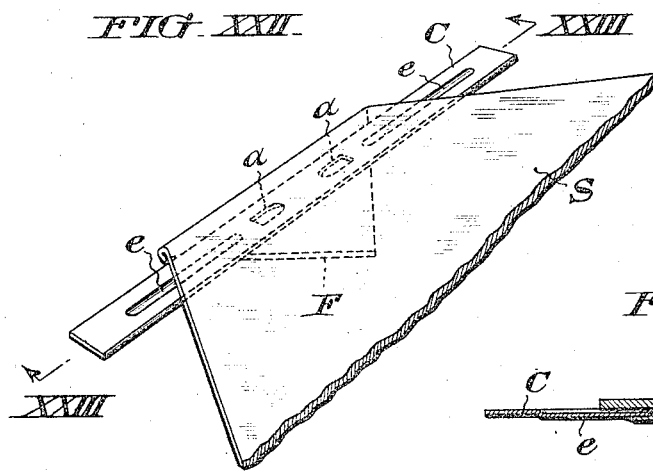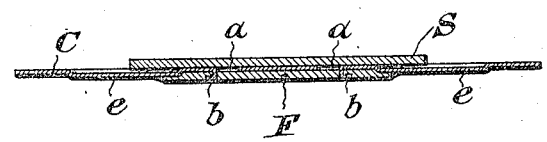

Patented Jan. 6, 1925.

1,522,234

UNITED STATES PATENT OFFICE.

WILLIAM FREEGARD AND MARIUS S. DARROW, OF ST. LOUIS, MISSOURI, ASSIGNORS TO THE BARBER ASPHALT COMPANY, OF PHILADELPHIA, PENNSYLVANIA, A CORPORATION OF WEST VIRGINIA.

SHINGLE STAPLING AND FOLDING MACHINE.

Application filed June 21, 1923. Serial No. 646,943.

*To all whom it may concern:*

Be it known that we, WILLIAM FREEGARD and MARIUS S. DARROW, citizens of the United States, residing at St. Louis, county of St. Louis, and State of Missouri, have invented certain new and useful Improvements in Shingle Stapling and Folding Machines, whereof the following is a specification, reference being had to the accompanying drawings.

Our invention relates generally to machines useful in connection with the manufacture of so-called prepared or flexible shingles, (for example constructed of felt saturated with asphaltum or other weatherproof and resistant compounds), and is directed, comprehensively speaking, toward provision of an organization capable of continuously fabricating means in the form of stapled metallic clips whereby the shingles may be subsequently secured to the supporting structure of a roof; of attaching the clips to the shingles; and of subsequently folding the shingles in such manner as to include or overlap the clips so that only end portions thereof extend or project beyond the shingle edges.

A further object of our invention is to afford mechanism or means with freely moving parts capable of effecting the folding of the shingles, for the purpose above mentioned, in a stage-wise manner so as to preclude fracture of the shingle material notwithstanding complete retroversion and the formation of comparatively sharp creases. One advantage accruing from this novel procedure being the possibility of dispensing with the necessity for application of heat in accomplishing the desired result, and likewise of water or other medium for the purpose of preventing sticking or adhesion.

Other objects and their attendant advantages will become readily apparent from the detailed description which follows of a typical embodiment of our invention; while the appended claims define the scope of the invention in so far as it comes within our present knowledge.

In the drawings, Fig. I is a plan view of a shingle stapling and folding machine conveniently illustrating the novel features of our invention.

Fig. II is a longitudinal sectional view of the same.

Fig. III is an end elevation of the machine as viewed from the right of Figs. I and II, portions thereof being broken away to avoid concealment of certain important details.

Fig. IV is an elevation of the mechanism for feeding the strip or ribbon metal from which the stapled securing clips are fabricated.

Fig. V is an end view of this mechanism viewed from the left of Fig. IV.

Fig. VI is an elevation of the opposite end of said ribbon feeding mechanism.

Fig. VII is a detail view on an enlarged scale showing the punch and die mechanism whereby the stapled securing clips are formed from the metallic ribbon or strip.

Fig. VIII is an end elevation of the punch and die mechanism viewed from the right of Fig. VII.

Fig. IX is a detail plan view on an enlarged scale of the mechanism whereby the shingles are folded or retroverted after the attachment of the securing clips.

Fig. X is a side elevation of the folding mechanism supra.

Fig. XI is a right hand end view of said mechanism.

Figs. XII to XVIII inclusive are detail views, some of them fragmentary in character and others in section, illustrating successive steps in the folding operation, the sectional figures of the group being indicated by corresponding numerals in Figs. IX and X.

Fig. XIX is a perspective view on an enlarged scale showing the details of one of the stapled securing clips.

Figs. XX to XXII inclusive show successive steps in the course of attaching a securing clip to a shingle and the manner in which the shingle is thereafter folded to include or overlap the clip.

Fig. XXIII is a detail sectional view more or less diagrammatically represented, taken along the line XXIII—XXIII in Fig. XXII.

It will perhaps facilitate the understanding of our invention by first describing the end which is to be accomplished by the machine forming the subject of this application and we will therefore direct attention first to Figs. XIX to XXIII inclusive of the drawings. In these figures the shingle is designated by the letter "S" and the securing clip by the letter "C." From examination of Figs. XIX, it will be noted that the clip "C" is constructed of strip metal "M" cut to an appropriate length for the purpose intended and stamped out centrally as at $a$—$a$ and the cut-out portions upset to afford laterally upstanding spurs or prongs $b$—$b$ constituting what may conveniently be termed a staple. These prongs $b$, $b$ are spaced a suitable distance apart to engage a substantial portion of the shingle material between them as will be presently explained. The extremities of the strip "M" beyond the staple prongs $b$—$b$ are preferably stiffened by longitudinally disposed embossings $e$—$e$. Clips C such as just described are secured crosswise of the shingle corners as suggested in Fig. XX, the shingle S being first placed in proper position relative to the prongs $b$—$b$ and the latter then forced into and through the shingle material. The next step in securing the clips C is illustrated in Fig. XXI from which it will be noted that the prongs $b$—$b$ are deflected preferably outwardly relative to one another and clinched against the shingle surface thereby securely fastening the clip C to the shingle S. The final step, i. e. the bending back of the shingle corner upon the body of the latter is shown in Figs. XXII, XXIII, the bending being so ordered as to effect a complete retroversion with the clip C included in the fold thus produced and its ends only projecting beyond the shingle edges.

With this preparatory explanation we will now proceed to describe the details of our improved mechanism by which the aforesaid results are accomplished. Referring first generally to Figs. I, II and III the means whereby the shingles S are progressed through the machine are comprehensively indicated at 1; the mechanism for concurrently feeding the metal "M" in strip or ribbon form from which the clips are formed, at 2; the mechanism for fabricating the clips, at 3, and the mechanism by which the shingle corners are subsequently folded at 4.

Confining attention for the time being to the progressing means 1, it will be observed that the same comprises a pair of rolls 5 and 6 which cooperate to intermittently feed the shingles "S" forward and between the main draft rolls indicated at 7 and 8. The surface of the roll 5 is segmental in form and thus limited in extent to bring about intermittent feeding of the shingles S, said surface being supported by end webs 9—9 counterbalanced as at 10—10 for stability of motion and secured to a shaft 11 which is journalled in appropriate bearings of the side frames 12 and 13 of the structure. In order to insure a firm grip upon the shingles S when the segmental surface of the roll 5 contacts with the smaller cooperative roll 6, the journal blocks 14 of the latter roll are mounted for vertical movement in slots afforded by the frames 12 and 13, and are urged upwardly by helical springs 15, see Fig. II. The roll 8 is for a like reason urged upwardly by a spring 16 against the companion draft roll 7. The several rolls thus far described are driven through the medium of a train of intermeshing gears and pinions 17, see Fig. I, said train in turn deriving motion from a master gear 18 mounted upon the main shaft 19 of the machine. This shaft 19 is driven through a worm gear 20 from a power shaft 21 which has secured to it a pulley 22 for belt connection with an electric motor or other prime mover, not shown. In addition to the rolls 5, 6, 7 and 8 the machine is equipped with an auxiliary pair of draft rolls 23, 24 which serve to draw the shingles S through the folding mechanism 4, a spring 25 operative upon the lowermost roll 24 of the pair functioning to maintain the necessary gripping pressure upon said shingles. The auxiliary draft rolls 23, 24, like the others, derive their motion from the gear train 17. Suitable clutch mechanism is of course in practice provided for controlling starting and stopping of the machine, but this may be of any approved standard type, and for this reason illustration thereof has been omitted from the drawings.

Coming now to the mechanism for feeding the metal "M" from which the clips are fabricated, reference is had to Figs. I, II, IV, V, and VI, wherein said metal will be observed to be of narrow ribbon form and drawn from a supply roll indicated at "R" in Fig. II. From this roll R the metallic ribbon is directed between a series of straightening rollers 30 journalled for free rotation between side members 31, 31 of a suitable housing secured to an extension of the main frame 12 of the machine. The rollers 30 are grooved as clearly shown for better directional guidance of the ribbon, and the upper ones of the series operate in intervals between the others and are arranged to be adjustably depressed by means of set screws 32 provided for this purpose. Associated with the rollers 30 is a stop 33 which will yield to permit free forward feeding of the metallic ribbon M, but functions to check any tendency of the same to move rearward under any springiness, that may be inherent in the same by reason of having been coiled in the roll "R." The stop or check 33 is pivotally hung from a shaft 34 extending between the side members 31—31 of the roller housing, and is urged into engagement with the ribbon by means of a helical tension spring indicated at 35. The ribbon is fed forward, i. e. in a direction to the left in Figs. II and IV, intermittently by an oscillating arm 36 fulcrumed at 37 to a bracket 38 projecting from the main side frame 12 of the machine. To the lower end of the lever 36 are bolted extensions 39 affording a bifurcation whose ends are pivotally connected, by means of links 40 with a pin 41 extending through a longitudinal slot 42 in a block 43 which is slidable along a dovetail guide bar 44. Another pair of links 45 serve to connect the pin 41 with a rocker arm 46 mounted to oscillate on a pivot 46ᵃ on the block 43, said arm carrying a finger 47 having a sharpened edge adapted to grip the ribbon. The gripping action of the finger 47 is maintained under the influence of a compression spring 48 concealed in the block 43 and influential upon the pin 41 and hence indirectly upon the arm 46, said finger being however free by this arrangement, to yield during the rearward strokes of the lever 36 so as not to induce retrograde motion in the ribbon at these times. Thus at each operation of the lever 36, a predetermined length of the ribbon "M" sufficient for the production of a clip "C" is fed forward to the punch and die mechanism 3. The required motion may be imparted to the lever 36 by any approved means, for example, a crank arm such as shown at 50, in Fig. I may be employed for this purpose and connected to the lever by a link 51. In order that the throw of the lever 36 may be varied to alter or to regulate the length of the ribbon fed forward at each actuation, the link 51 is not directly attached to the crank arm but to a plate 51ᵃ adjustable longitudinally on said crank arm, a thumb screw 52 being provided for fixing the plate in the desired adjusted positions.

The metallic ribbon "M" fed as just described is advanced to the punch and die mechanism 3 whose details are best illustrated in Figs. VII and VIII. In the course of its progression, the ribbon M is directed longitudinally across a guide plate shown at 55, the same being provided with suitable overlapping members which incidentally prevent lateral displacement of the ribbon. This plate is yieldingly supported at the level indicated in Figs. VII and VIII by a plurality of compression springs such as shown at 57, the same being anchored for maintenance of the proper position in an underlying block 56 rigidly secured to the side frame 12 of the machine. Fixed in said block are dies 58, 58 by which the embossments e, e are set up in the clips "C" said dies registering with clearance apertures 60 in the plate 55 as the latter is depressed in the manner which will be presently explained. The block 56 further carries punches 61 which form the cuts a, a in the clips "C" and erect therefrom the upstanding projections or prongs b, b. Cooperating with the plate 55 and the dies 58 and punches 61 is a pressure plate 62 carried by a head 63 adjustably set in a vertically reciprocatory slide block 64 (see Fig. II). This block 64 is guided in a slide bearing 65 surmounted on the frame 12 and is in turn connected by means of an adjustable link 66 to an eccentric 67 on the drive shaft 19 to which reference has previously been made. The head 63 also carries in juxtaposition to the element 62, a plate 70 which is normally pressed downward away from the head 63 by a number of helical compression springs such as indicated at 71, the extent of depression being limited by shouldered screws 72. The plate 70 is apertured as at 73 to accommodate upsetting tools 74 which are fixed in said head. The lower ends of the tools 74 are slightly chamfered so as to determine outward deflection of the prongs b, b upon the descent of the head 63. The movement of the plate 70 is in opposition to a platen block 75 which like the block 56 is fixedly secured to the frame 12. For the purpose of cutting away a finished clip from the end of the strip "M" the rear transverse edge 76 of the block 75 is sharpened for cooperation after the manner of a shear with the edge 77 of the block 62. From what has just been disclosed it will be apparent that a clip C is formed simultaneously, with severance of one previously formed during each actuation of the head 63.

5. In the course of the operation of the machine the shingle S is placed so that one corner thereof projects beneath the plate 70 and over the prongs b, b of the waiting completely formed clip "C" which has not yet been severed or cut from the ribbon M, so that upon subsequent depression of the head 63 the shingle S is depressed or forced downwardly, causing the prongs b, b to penetrate the shingle material. In continued motion of the head 63, the tools 74 encounter the projecting end of the prongs b, b thereby upsetting them as already understood and clinching them against the face of the shingle S, the plate 70 yielding during this action by virtue of interposition of the springs 71.

The shingle S disposed in a diagonal position with the clip C attached across its corner in the manner just explained, is next bodily advanced by the intermittent roll couple 5, 6 to the main draft rolls 7 and 8 whereby it is immediately progressed to the folding mechanism 4 whose construction is best illustrated in Figs. IX, X and XI. This folding mechanism includes a frame or housing 80 supporting a series of freely revolving rollers which cooperate in pairs to successively bend the shingle corner in a stage-wise manner until the same has been completely folded or retroverted upon the main or body portion of the shingle, the object of such successive folding being, as previously stated, to prevent fracture. The first roll to be encountered is designated at 81 in the drawings, the same being mounted upon a horizontal axis 82 and provided at one side with a circumferential flange 83 which overlaps the smaller, cooperating, companion roller 84 as best illustrated in Fig. XI to bend the shingle corner substantially through an angle of approximately ninety degrees, the shingle S being at the same time supported through the assistance of a plate 85 fixedly secured in any convenient manner alongside the housing 80. In being further advanced, the shingle S next encounters a second pair of horizontally disposed, cooperative rollers 86, 87 the latter of these rollers being in the form of a comparatively thin disk and supported for free rotation in a longitudinal cleft 88 of the plate 85. The roller 86, as will be best seen from Figs. X and XIII is formed with an angular peripheral groove which engages the shingle S and bends the same still further about the crease already partially established by the rollers 82, 84. In order to facilitate the last described bending operation and also the one which is to follow, the plate 85 is appropriately beveled at opposite sides as clearly suggested at 89 see Figs. IX and XV. The final stage of bending of the shingle corner is effected through the cooperation of still another pair of horizontally disposed, cooperative rollers 90 and 91, of which the former is more sharply grooved than the roller 86 of the previous pair so as to determine substantially a full 180° bend as shown in Fig. XIV. The shingle S is next passed between vertically arranged pinch rolls 92—93, and 94—95, these rolls being separated by an interval as will be manifest from Figs. IX and X, where a ledger roll 96 is interposed to operate directly upon the creased edge of the shingle S, and by reason of said roll having a rounded peripheral groove, the crease is made permanent. The latter action is promoted by the rollers 94 and 95, which it will be noted from Fig. XVIII, are more closely spaced than the first pair of pinch rollers 92, 93. By this succession and arrangement of the several pair of co-operative rollers, we are enabled to produce a perfect fold through successive bendings without causing any break or fracture of the shingle material along the line of creasing, and therefore without in any way marring their strength or appearance. Such folding may moreover be readily acomplished without application of heat, and furthermore without the aid of water or other preventative against sticking since bending is accomplished entirely by aid of freely moving parts.

In feeding the shingles S to the machine, the latter are initially placed by hand or otherwise, upon a suitable support such as shown at 100, sufficiently flexible to yield slightly when staples are inserted in the shingle, proper positioning being determined through the assistance of a gauge 101, such as an angle bar adjustably secured to the top of the support 100, and a stop 102 best shown in Figs. I and II. The stop 102 is in the form of an upstanding lug at the end of a lever 103 pivoted, for rocking motion, at 104 to a fixed bracket supported by the main frame 12 of the machine. The opposite extremity of the lever 103 carries a roller 105 designed to engage a disk cam 106 upon the shaft 11 of the progressing roll 5. Consequently, in the course of each rotation of the cam 106, the roller end of the lever 103 is released, and the stop 102 thereby retracted from the path of the shingle S so that the latter may be advanced, after the application of the clip C thereto, to the main draft rolls 7 and 8 and thereby to the folding mechanism 4.

The operation of the device is as follows:

The shingles "S" are successively placed upon the support 100 in a position determined by the guide 101 and the stop 102, so that their corners are properly positioned over the formed clip "C" not yet cut from the end of the ribbon "M." Upon subsequent depression of the head 63, the shingle end is forced downward onto the clip C, the prongs $b$, $b$ of the latter incidentally penetrating the shingle material until engaged by the upsetting tools 74 whereby they are headed over and clinched and the clip at the same time severed from the strip "M" as already understood. The timing of the machine is such that immediately upon the application of the clip C, the segmental surface of the roll 5 engages the shingle S and with the aid of the roll 6 advances the same to the main draft rolls 7 and 8. Concurrently with this action, the ribbon "M" is advanced to bring the end portion embossed and punched during the last depression of the head 63 into position beneath the plate 70 in preparation for attachment to the next shingle S, which in the interim is placed in proper position upon the support 100. Returning now to the shingle S which has been advanced to the rolls 7 and 8, the same is next progressed through the folding mechanism 4 by the joint cooperation of the rolls 7 and 8 and the auxiliary draft rolls 23 and 24, and thereby successively operated upon by the rollers 81—84, 86—87, 90—91, 92—93, 96, 94—95, whereby it is bent and creased as previously explained.

Having thus described our invention, we claim:

1. A shingle stapling and folding machine comprising means for feeding strip metal thereinto, co-active triune means adapted to farbircate a securing clip while attaching a formed one to an individual shingle and simultaneously severing the same from the strip metal, and means for progressively retroverting the shingle tip with the clip included in the fold and its ends projecting beyond the edges thereof.

2. A shingle stapling and folding machine comprising means for intermittently feeding strip metal thereinto, co-active triune means adapted to fabricate a securing clip while attaching a formed one to an individual shingle and simultaneously severing the same from the strip metal, and means for progressively retroverting the shingle tip with the clip included in the fold and its ends projecting beyond the edges thereof.

3. A shingle stapling and folding machine comprising means for intermittently feeding strip metal thereinto, co-active triune devices adapted to fabricate a reinforced securing clip while attaching a formed one to an individual shingle and simultaneously severing the same from the strip metal, and means for retroverting the shingle tip with the clip included in the fold and its ends projecting beyond the edges thereof.

4. A shingle stapling and folding machine comprising mechanism for intermittently feeding strip metal thereinto, a triune device adapted to fabricate a reinforced securing clip while attaching a formed one to an individual shingle and simultaneously severing the same from the strip metal, and mechanism for progressively retroverting the shingle tip with the clip included in the fold and its ends projecting therefrom.

5. A shingle stapling and folding machine comprising mechanism for intermittently feeding strip metal thereinto, associated means for preventing retrograde motion, a co-active triune device adapted to fabricate a reinforced securing clip while attaching a previously formed one to an individual shingle and simultaneously severing the same from the strip metal, and mechanism for progressively retroverting the shingle tip with the clip included in the fold and its ends projected exterior thereof.

6. A shingle stapling and folding machine comprising mechanism for intermittently feeding strip metal thereinto, associated mechanism for preventing retrograde motion of the strip metal, co-active triune mechanism adapted to fabricate a securing clip while attaching a previously formed one to an individual shingle and simultaneously severing the same from the strip metal, mechanism for progressively retroverting the shingle tip with the clip included in the fold, and positively coordinated means for concurrent actuation of all the aforesaid mechanisms.

7. A shingle stapling and folding machine including co-active triune means adapted to fabricate securing clips from continuous strip material automatically fed thereinto, means for attaching the fabricated clips to shingles, and means for concurrently severing the attached clips from the strip material.

8. A shingle stapling and folding machine including co-active triune means adapted to successively fabricate securing clips with projecting prongs from continuous strip metal, means for subsequently attaching the fabricated clips individually to prepared shingles by forcing the prongs through the shingle material and clinching them upon the opposite shingle faces and means for concurrently severing each attached clip from the strip of metal.

9. A shingle stapling and folding machine including coactive triune punch and die means for fabricating shingle securing clips with projecting prongs from continuous strip metal, means for subsequently attaching the fabricated clips individually to prepared shingles by forcing the prongs through the shingle material and clinching them upon the opposite shingle faces, and means for concurrently severing each attached clip from the strip metal.

10. In a shingle stapling and folding machine of the character described the combination of co-active triune means for successively forming and severing securing clips from a continuous strip and attaching the formed clips at the same time to individual shingles.

11. In a machine of the character described the combination of co-active means for successively fabricating securing clips from continuous strip metal, and means for attaching the clips individually to shingles and incidentally cutting them from the strip.

12. In a machine of the character described co-active triune means adapted to fabricate securing clips from continuous strip metal, to sever said clips from the strip metal, and incidentally to attach each successive clip to an individual shingle, in combination with means for intermittently advancing the strip metal in increments corresponding to the desired length of the clips.

13. In a machine of the character described, co-active triune means for fabricating shingle securing clips from a continuous strip of metal intermittently progressed therethrough including a yieldingly supported plate across which the strip travels, fixed punches registering with correspondingly configured apertures in the plate, means cooperating with the plate to cause the punches to penetrate the metallic strip and set up projecting prongs, and means for subsequently severing the completed clips thus formed from the strip and concurrently attaching them individually to shingles.

14. In a machine of the character described, co-active triune means for fabricating securing clips from a continuous strip of metal intermittently progressed therethrough including a yieldingly supported plate across which the strip travels, fixed punches and embossing dies registering respectively with apertures and recesses in the plate, means for cooperating with the plate to simultaneously effect embossment and penetration of the strip by the punches to set up projecting prongs, and means for subsequently severing the completed clips thus formed from the strip and concurrently attaching them individually to shingles.

15. In a machine of the character described, the combination of co-active triune means for fabricating, severing and attaching securing clips with projecting fastening prongs to shingles including a support, said means also including a yieldable pressure device cooperative with the support for forcing the prongs of the clips through the shingle material.

16. In a machine of the character described, the combination of a co-active triune means for fabricating, severing and attaching securing clips with projecting fastening prongs to shingles including a support, said means also including a yieldable member cooperative with the support for forcing the prongs through the shingle material, and upsetting tools for clinching the protruding ends of the prongs over upon the opposite faces of the shingle material.

17. In a machine of the character described, the combination of a co-active triune means for fabricating, severing and attaching securing clips with projecting fastening prongs to shingles including a support for the clips, said means also including a yieldable member for pressing the shingle against the clip in effecting attachment of the latter through forced penetration of the prongs into the shingle material.

18. In a machine of the character described, the combination of a co-active triune means for fabricating, severing and attaching securing clips with projecting prongs to shingles including yieldable means for forcing the prongs of the clips through the shingle material, and associated means for clinching the protruding ends of the prongs over upon the opposite faces of the shingles.

19. In a machine of the character described, the combination of a co-active triune means for fabricating, severing and attaching securing clips with projecting prongs to shingles including a support, a head movable toward and away from the support, a yieldable plate carried by said head and adapted to cooperate with the support in forcing the prongs through the shingle material, and upsetting tools carried by the head and operative during continued movement of the latter to clinch the protruding ends of the prongs over upon the shingle surface.

20. In a machine of the character described, the combination of co-active triune means for forming and severing a shingle securing reinforced clip from a continuous strip of metal, characterized by means for simultaneously attaching a previously formed clip to a shingle.

21. In a machine of the character described, the combination of co-active triune means for forming a shingle securing reinforced clip from a continuous strip of metal, characterized by means for simultaneously severing a previously formed clip from the strip while attaching the same to a shingle.

22. In a machine of the character described, the combination of co-active triune means for fabricating, severing and attaching securing clips to prepared shingles, and means for progressively bending the shingle tips to effect complete retroversions with said clips enveloped in the folds thus produced.

23. A shingle stapling and folding machine including means for intermittently feeding strip metal thereinto, co-active triune means for fabricating, severing and attaching a securing clip to prepared individual shingles, and means for folding the shingle tip to include the clip, said means comprehending a succession of pairs of cooperative rollers whereby the folding aforesaid is progressively accomplished until complete retroversion is effected.

24. A shingle stapling and folding machine including means for intermittently feeding strip metal thereinto, co-active triune means for fabricating, severing and attaching a securing clip to prepared individual shingles, means for folding the shingle tip to include the clip, said means comprehending a succession of pairs of cooperative rollers whereby the folding aforesaid is progressively accomplished until complete retroversion is effected, and pinch-rolls subsequently operative against the edges of the folds to insure permanent creasing.

25. A shingle stapling and folding machine including means for intermittently feeding strip metal thereinto, co-active triune means for fabricating, severing and attaching a securing clip to prepared individual shingles, means for folding the shingle tip to include the clip, said latter means comprehending a succession of pairs of cooperative rollers whereby the folding aforesaid is progressively accomplished until complete retroversion is effected, and spaced pairs of pinch-rollers with an intermediate auxiliary grooved ledger roller operative directly against the edges of the folds to insure permanent creasing.

26. A shingle stapling and folding machine including means for automatically feeding strip metal thereinto, co-active triune means for fabricating, severing and attaching a securing clip to prepared individual shingles, means for folding the shingle tip to include the clip, said means comprehending a succession of pairs of cooperative rollers whereby the folding aforesaid is progressively accomplished until complete retroversion is effected, the latter means comprehending a pair of cooperative rollers one with a circumferential flange overlapping the sides of the other whereby a bend of substantially ninety degrees is initially produced, and a succeeding series of rollers cooperative in pairs and with appropriately configured peripheries for interlapping to effect further bending progressively until complete retroversion is accomplished.

27. In a machine of the character described, the combination of co-active triune means for fabricating, severing and attaching securing clips to prepared shingles, a stop for determining proper positioning of the shingles relative to the aforesaid clip means, and means for automatically withdrawing the stop to permit advancing of the shingles after attachment of the clips thereto.

28. In a machine of the character described, the combination of a co-active triune means for fabricating, severing and attaching securing slips to prepared shingles, and a pair of continuously revolving rollers one having but a limited segmental surface for intermittent cooperation with the companion roll to engage the shingles successively in removing them from the means aforesaid after application of the clips.

29. A shingle stapling and folding machine including means for maintaining shingles disposed in a diagonal position during progression through the machine, means positioned at one side of the machine whereby reinforced securing clips are simultaneously fabricated, severed and individually attached crosswise of the corner of each successive shingle, and means whereby the same corner and attached clip is subsequently and progressively bent over upon the body of the shingle to include the clip within the resulting folds.

In testimony whereof, we have hereunto signed our names at Madison, Illinois, this fifteenth day of June, 1923.

WILLIAM FREEGARD.
MARIUS S. DARROW.

Witnesses:
C. H. SMITH,
MYRAH ANDRES-HEIDER.